(12) United States Patent
Lee

(10) Patent No.: US 9,509,928 B2
(45) Date of Patent: Nov. 29, 2016

(54) BIAS SAMPLING DEVICE AND CMOS IMAGE SENSOR INCLUDING THE SAME

(71) Applicant: SK hynix Inc., Gyeonggi-do (KR)

(72) Inventor: Woong-Hee Lee, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 51 days.

(21) Appl. No.: 14/559,489

(22) Filed: Dec. 3, 2014

(65) Prior Publication Data

US 2015/0326804 A1   Nov. 12, 2015

(30) Foreign Application Priority Data

May 8, 2014 (KR) ........................ 10-2014-0054890

(51) Int. Cl.
*H04N 5/357* (2011.01)
*H04N 5/365* (2011.01)
*H04N 5/374* (2011.01)
*H04N 5/3745* (2011.01)
*H04N 5/378* (2011.01)

(52) U.S. Cl.
CPC ............ *H04N 5/357* (2013.01); *H04N 5/3575* (2013.01); *H04N 5/3658* (2013.01); *H04N 5/378* (2013.01); *H04N 5/37455* (2013.01); *H04N 5/37457* (2013.01)

(58) Field of Classification Search
CPC .. H04N 5/3575; H04N 5/3658; H04N 5/374; H04N 5/37455; H04N 5/378
USPC .................................................. 348/308, 313
See application file for complete search history.

(56) References Cited

U.S. PATENT DOCUMENTS

2008/0239127 A1* 10/2008 Koseki ................. H04N 5/3575
348/308

FOREIGN PATENT DOCUMENTS

KR        1020060002698    *   1/2006   ............... G05F 3/16

* cited by examiner

*Primary Examiner* — Nhan T Tran
*Assistant Examiner* — Chan Nguyen
(74) *Attorney, Agent, or Firm* — IP & T Group LLP

(57) ABSTRACT

A bias sampling device includes a reference current generation unit suitable for generating a reference current; a plurality of multi-staged current mirror circuits suitable for receiving the reference current generated from the reference current generation unit and outputting a bias voltage; and a bias sampling unit suitable for performing sampling on a first bias voltage of a first current mirror circuit of the plurality of multi-staged current mirror circuits, wherein the first bias voltage of the first current mirror circuit, which is located prior to a final-staged current mirror circuit of the plurality of multi-staged current mirror circuits, is preset.

12 Claims, 9 Drawing Sheets

BIAS SAMPLING DEVICE AND CMOS IMAGE SENSOR INCLUDING THE SAME

CROSS-REFERENCE TO RELATED APPLICATIONS

The present application claims priority of Korean Patent Application No. 10-2014-0054890, filed on May 8, 2014, which is incorporated herein by reference in its entirety.

BACKGROUND

1. Field

Various exemplary embodiments of the present invention relate to a bias sampling device and a complementary metal-oxide semiconductor (CMOS) image sensor including the same and, more particularly, to a bias sampling device and a CMOS image sensor including the same for sampling and providing a bias voltage.

2. Description of the Related Art

FIG. 1A is a block diagram illustrating a conventional CMOS image sensor having a local bias sampling structure. FIG. 1B is a block diagram illustrating a conventional CMOS image sensor having a global bias sampling structure. FIGS. 2A to 2C are diagrams illustrating image deterioration caused by global bias sampling.

Referring to FIG. 1A, the conventional CMOS image sensor having the local bias sampling structure may include a row decoder and pixel driver 111, a pixel array 112, a bias voltage generation unit 113, a pixel amplifying unit 114 and a read-out processing unit 115.

The row decoder and pixel driver 111 drives pixels, which are selected by a row decoder, included in the pixel array 112.

The pixel array 112 senses light using an optical element and generates a pixel signal corresponding to sensed light. The pixels, which are selected by a row decoder and driven by the pixel driver, of the pixel array output a pixel signal. The pixel signal is an electrical analog signal and includes a reset voltage and a signal voltage.

The bias voltage generation unit 113 generates and provides a bias voltage to a load transistor 116 of the pixel amplifying unit 114 through transmission line VBIAS1.

The pixel amplifying unit 114 amplifies the pixel signal of the pixel array 112 and transfers an amplified pixel signal to the read-out processing unit 115.

The read-out processing unit 115 reads-out the amplified pixel signal of the pixel amplifying unit 114 and outputs read-out data.

Since the bias voltage applied to the load transistor 116 of the pixel amplifying unit 114 is directly provided from the bias voltage generation unit 113, circuit noise generated from the bias voltage generation unit 113 or external noise may be applied to the load transistor 116, and quality deterioration may occur.

In order to prevent quality deterioration caused by circuit or external noise, a local bias sampling structure, using one sampling switch 117 and one sampling capacitor 118 included in the pixel amplifying unit 114 of each column, is widely used.

However, as shown in FIG. 1A, with the local bias sampling structure, since a plurality of sampling capacitors having a large capacity and thus occupying a large space are needed to prevent linearity deterioration, which is caused by the coupling of an output node of the pixel array 112, the CMOS image sensor having the local bias sampling capacitor structure has an increased size.

Referring to FIG. 1B, the conventional CMOS image sensor having the global bias sampling structure may include a row decoder and pixel driver 121, a pixel array 122, a bias voltage generation unit 123, a pixel amplifying unit 124, a read-out processing unit 125, a single sampling switch 127 and a single sampling capacitor 128. The row decoder and pixel driver 121, the pixel array 122, the bias voltage generation unit 123, and the read-out processing unit 125 shown in FIG. 1B are the same as the row decoder and pixel driver 111, the pixel array 112, the bias voltage generation unit 113, and the read-out processing unit 115 described with reference to FIG. 1A. To prevent quality deterioration caused by circuit noise or external noise, the global bias sampling structure using the single sampling switch 127 and the single sampling capacitor 128 at an entire column is also widely used.

However, as shown in FIG. 1B, in the global bias sampling structure, the CMOS image sensor may be implemented in a relatively small size. But, as shown in FIGS. 2A and 2C, a pixel output corresponding to a region B is saturated and sharply changes with a large amplitude. This change causes a change of voltage level in a transmission line VBIAS2 through a coupling capacitor to the transmission line VBIAS2. Herein, since the transmission line VBIAS2 is sampled through a global bias sampling structure, a gate voltage VGS of a load transistor of a region A is accordingly changed and thus a data error occurs to decrease the pixel data value of the region A due to the change of the gate voltage VGS. Therefore, as shown in FIG. 2B, an output image of the region A is darker than the corresponding real subject.

SUMMARY

Various exemplary embodiments of the present invention are directed to a bias sampling device and a CMOS image sensor including the same for sampling a bias voltage at a bias voltage supply target circuit, e.g., a pixel amplifying unit, of a previous stage and providing a sampled bias voltage to a bias voltage supply target circuit of a post stage.

Various exemplary embodiments of the present invention may prevent quality deterioration caused by circuit noise or external noise, which is respectively provided from a bias voltage generation unit or an external device, and may solve problems of the local bias sampling structure and the global bias sampling structure. That is, various exemplary embodiments the present invention may be implemented in a small area, and prevent the distortion of data at a pixel amplifying unit.

An exemplary embodiment of the present invention may include: a reference current generation unit suitable for generating a reference current; a plurality of multi-staged current mirror circuits suitable for receiving the reference current generated from the reference current generation unit and outputting a bias voltage; and a bias sampling unit suitable for performing sampling on a first bias voltage of a first current mirror circuit of the plurality of multi-staged current mirror circuits, wherein the first bias voltage of the first current mirror circuit, which is located prior to a final-staged current mirror circuit of the plurality of multi-staged current mirror circuits, is preset.

The final-staged current mirror circuit may be of a cascade type.

Each of the first and final-staged current mirror circuits may comprise two or more transistors. The bias sampling device may further comprise a first sampling switch disposed between the transistors of the first current mirror circuit, and a second sampling switch disposed between the transistors of the final-staged current mirror circuit.

Each of the first current mirror circuit and the final-staged current mirror circuit may be of a cascade type.

The bias sampling unit may switch a voltage applied to a gate of the first sampling switch before a rising timing of the voltage applied to the gate of a reset transistor after a read-out of a pixel data is completed.

In accordance with another exemplary embodiment of the present invention, a complementary metal-oxide semiconductor (CMOS) image sensor includes a row decoder and pixel driver suitable for selecting and driving a pixel of a pixel array; a pixel amplifying unit suitable for amplifying a pixel signal of the pixel array; a bias sampling device suitable for performing sampling on a first bias voltage of a first current mirror circuit of a plurality of multi-staged current mirror circuits, and applying the sampled first bias voltage to the pixel amplifying unit; and a read-out processing unit suitable for reading-out the pixel signal amplified by the pixel amplifying unit, wherein the first bias voltage of the first current mirror circuit, which is located prior to a final-staged current mirror circuit of the plurality of multi-staged current mirror circuits, is preset.

The bias sampling device may include a reference current generation unit suitable for generating a reference current; the plurality of multi-staged current mirror circuits suitable for receiving the reference current generated from the reference current generation unit and outputting a bias voltage; and a bias sampling unit suitable for performing sampling on the first bias voltage of the first current mirror circuit of the plurality of multi-staged current mirror circuits.

The final-staged current mirror circuit may be of a cascade type.

Each of the first and final-staged current mirror circuits may comprise two or more transistors. The bias sampling device may further comprise a first sampling switch disposed between the transistors of the first current mirror circuit, and a second sampling switch disposed between the transistors of the final-staged current mirror circuit.

Each of the first current mirror circuit and the final-staged current mirror circuit may be of a cascade type.

The bias sampling unit may switch a voltage applied to a gate of the first sampling switch before a rising timing of the voltage applied to the gate of a reset transistor after a read-out of pixel data is completed.

The CMOS image sensor may further include a capacitor suitable for preventing image deterioration caused by a coupling capacitor between a second bias voltage node and a pixel output line.

DETAILED DESCRIPTION

Figure 1A:
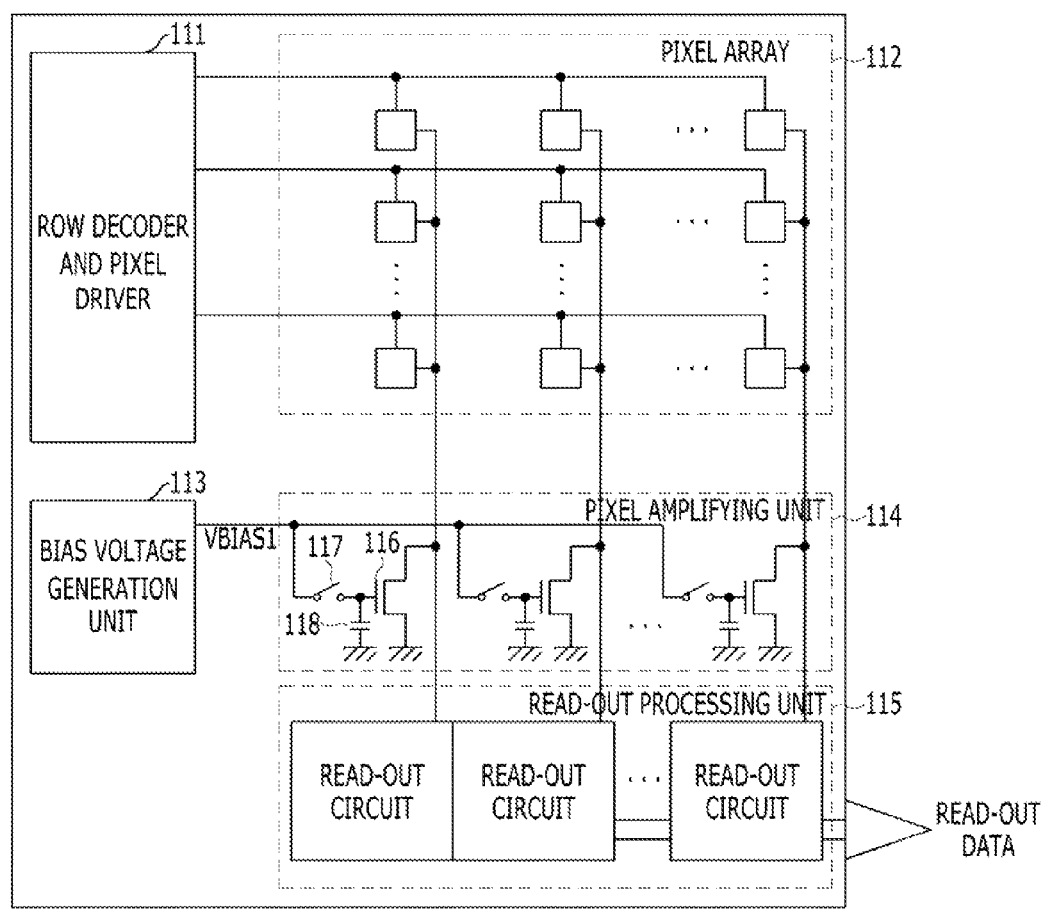
FIG. 1A is a block diagram illustrating a conventional CMOS image sensor having a local bias sampling structure.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, reference numerals correspond directly to the like parts in the various figures and embodiments of the present invention.

The drawings are not necessarily to scale and, in some instances, proportions may have been exaggerated in order to clearly illustrate features of the embodiments. In this specification, specific terms have been used. The terms are used to describe the present invention, and are not used to qualify the sense or limit the scope of the present invention.

It is also noted that in this specification, 'and/or' represents that one or of components arranged before and after 'and/or' is included. Furthermore, "connected/coupled" refers to one component not only directly coupling another component but also indirectly coupling another component through an intermediate component. In addition, a singular form may include a plural form as long as it is not specifically mentioned in a sentence. Furthermore, 'include/comprise' or 'including/comprising' used in the specification represents that one or more components, steps, operations, and elements exist or are added.

Figure 3A:
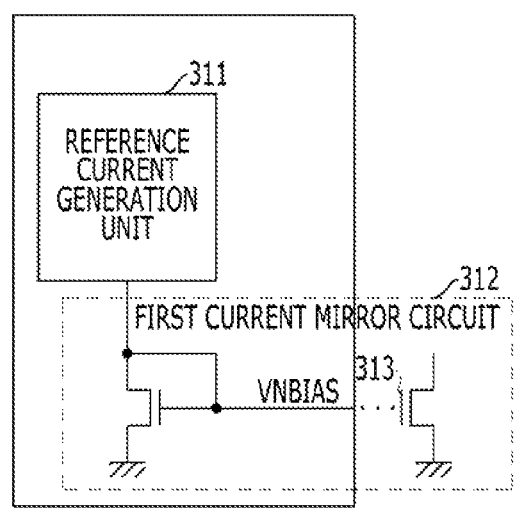
FIGS. 3A and 3B are block diagrams illustrating a bias voltage generation unit.
Figure 3B:
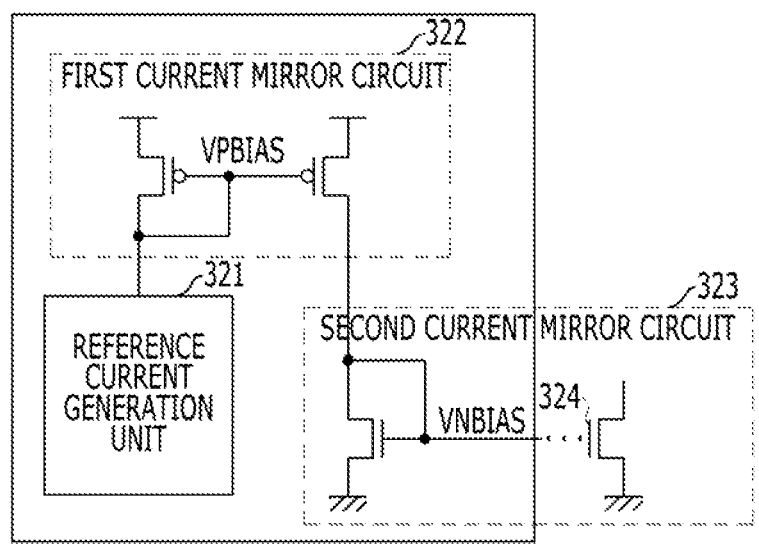

FIGS. 3A and 3B are block diagrams illustrating a bias voltage generation unit.

FIG. 3A shows a bias voltage generation unit having a current mirror circuit of a single stage structure, and FIG. 3B shows a bias voltage generation unit having a current mirror circuit of a multi stage structure.

As shown in FIG. 3A, the bias voltage generation unit having the single-stage current mirror circuit may include a reference current generation unit 311 and a first current mirror circuit 312.

Figure 1B:
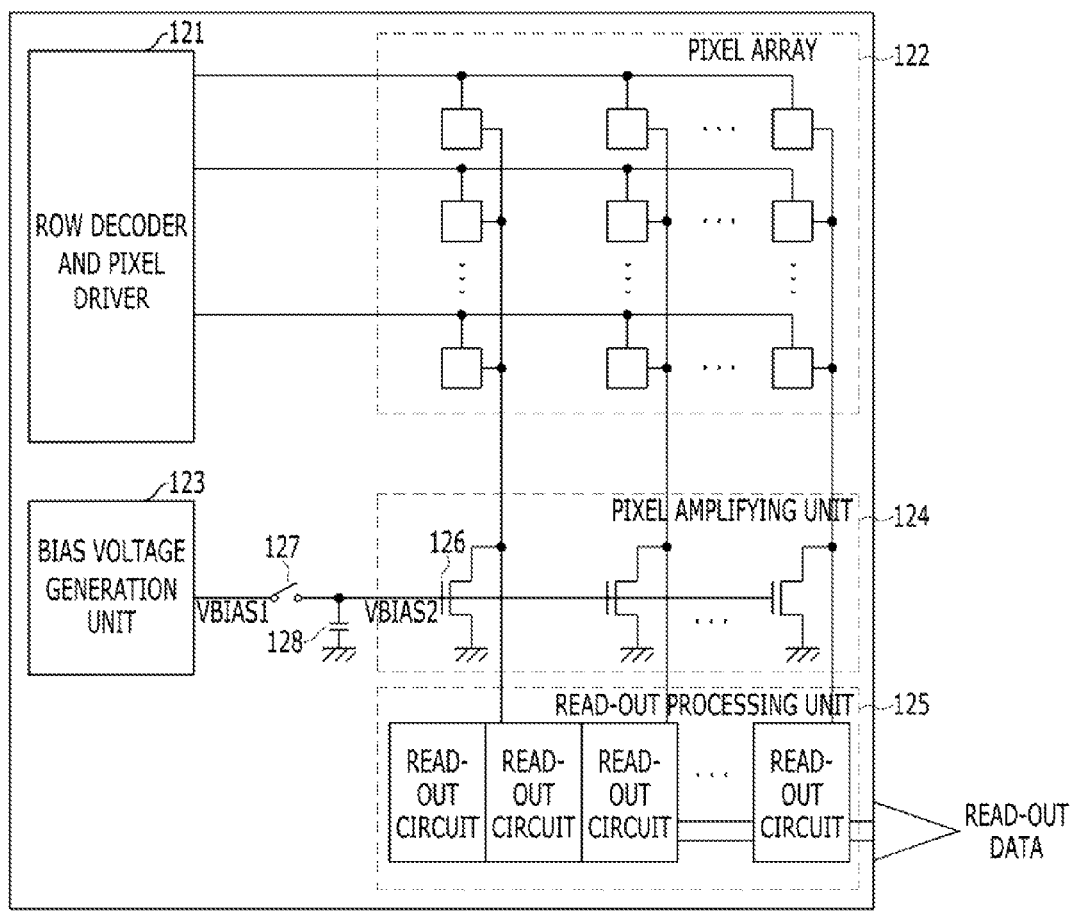
FIG. 1B is a block diagram illustrating a conventional CMOS image sensor having a global bias sampling structure.

The reference current generation unit 311 generates a reference current, and may be implemented with a band gap reference circuit, which is widely used. The first current mirror circuit 312 receives the reference current generated from the reference current generation unit 311 and provides a bias voltage to a pixel amplifying unit (not shown). A transistor 313 included in the first current mirror circuit 312 may be the load transistor of the pixel amplifying unit described with reference to FIGS. 1A and 1B.

As shown in FIG. 3B, the bias voltage generation unit having the multi-stage current mirror circuit may include a reference current generation unit 321, a first current mirror circuit 322 and a second current mirror circuit 323.

The reference current generation unit 321 is the same as the reference current generation unit 311 described with reference to FIG. 3A. The first current mirror circuit 322 and the second current mirror circuit 323, which are included in the bias voltage generation unit having the multi-stage current mirror circuit, receive the reference current generated from the reference current generation unit 321 and provide a bias voltage to a pixel amplifying unit (not shown). A transistor 324 included in the second current mirror circuit 323 may be the load transistor of the pixel amplifying unit described with reference to FIGS. 1A and 1B.

Figure 4:
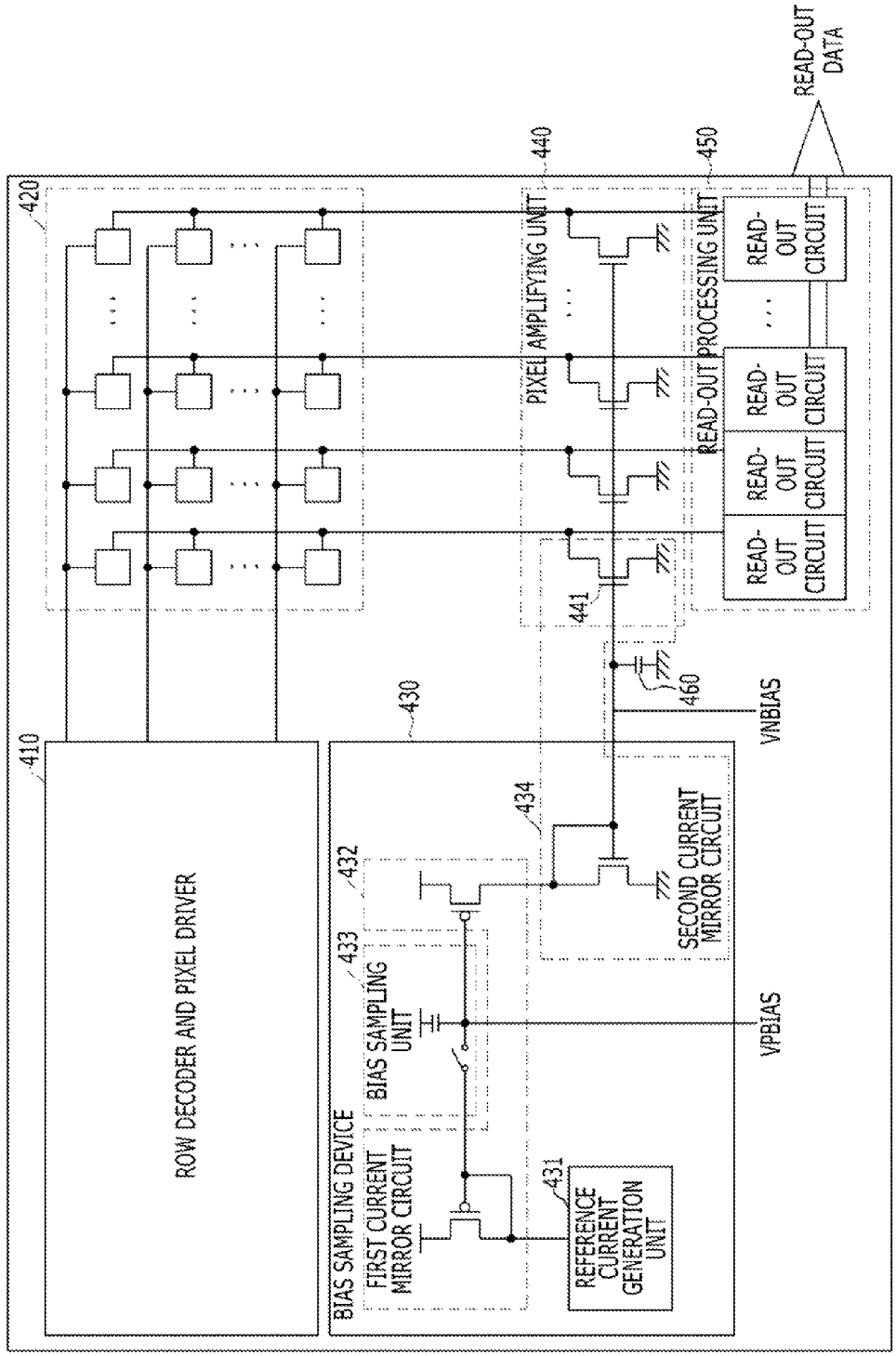
FIG. 4 is a circuit diagram illustrating a bias sampling device and a CMOS image sensor including the same in accordance with an exemplary embodiment of the present invention.

FIG. 4 is a circuit diagram illustrating a bias sampling device 430 and a CMOS image sensor including the same in accordance with an exemplary embodiment of the present invention.

Referring to FIG. 4, the CMOS image sensor may include a row decoder and pixel driver 410, a pixel array 420, a bias voltage generation unit 430, a pixel amplifying unit 440, a read-out processing unit 450, and a capacitor 460. The row decoder and pixel driver 410, the pixel array 420, the pixel amplifying unit 440, and the read-out processing unit 450 shown in FIG. 4 are the same as the row decoder and pixel drivers 111 and 121, the pixel arrays 112 and 122, the pixel amplifying units 114 and 124, and the read-out processing units 115 and 125 described with reference to FIGS. 1A and 1B.

Referring to FIG. 4, the bias voltage generation unit 430 may have a reference current generation unit 431, a first current mirror circuit 432, a second current mirror circuit 434, and a bias sampling unit 433. The bias sampling device 430 may be implemented with the multi stage current mirror circuit described with reference to FIG. 3B.

The bias sampling device 430 performs and provides sampling on the first bias voltage VPBIAS of the first current mirror circuit 432 to the pixel amplifying unit 440. The bias sampling device 430 may perform sampling on a first bias voltage VPBIAS of the first current mirror circuit 432, which is a previous-staged current mirror circuit to a final-staged current mirror circuit, or the second current mirror circuit 434, rather than sampling on a second bias voltage VNBIAS provided to a load transistor 441 of the pixel amplifying unit 440, which is one of transistors included in the second current mirror 434. The first mirror circuit 432 may be a PMOS current mirror circuit and the second mirror circuit 434 may be an NMOS current mirror circuit.

The reference current generation unit 431 generates a reference current. The first current mirror circuit 432 and the second current mirror circuit 434 receive the reference current generated from the reference current generation unit 431 and provide a bias voltage to the pixel amplifying unit 440.

The bias sampling unit 433 performs sampling on the first bias voltage VPBIAS of the first current mirror circuit 432, which is coupled to the second current mirror circuit 434.

The CMOS image sensor in accordance with an embodiment of the present invention may further include the capacitor 450 for preventing image deterioration caused by coupling capacitance between a pixel output line and a voltage node of a second bias VNBIAS.

Figure 5A:
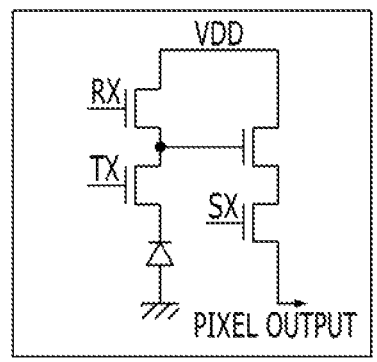
FIG. 5A is a circuit diagram illustrating a general pixel unit.
Figure 5B:
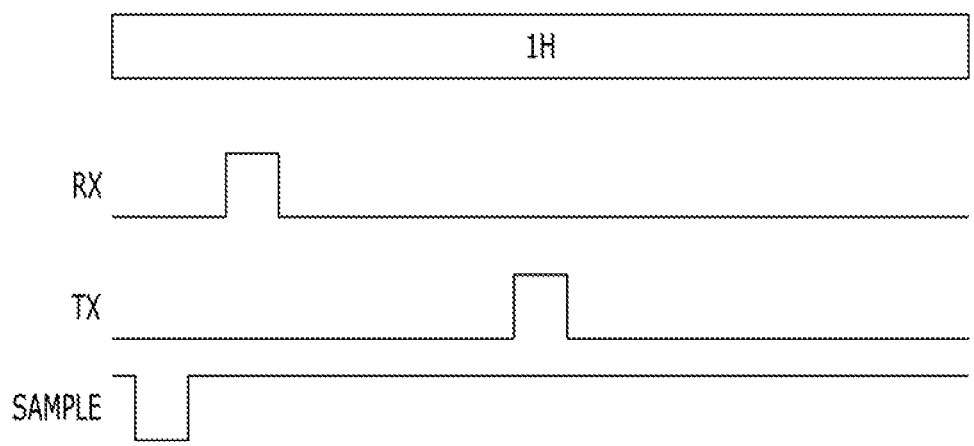
FIG. 5B is a timing diagram illustrating sampling of a bias voltage of a CMOS image sensor in accordance with an exemplary embodiment of the present invention.

FIG. 5A is a circuit diagram illustrating a general pixel unit, and FIG. 5B is a timing diagram illustrating sampling of a bias voltage of a CMOS image sensor in accordance with an exemplary embodiment of the present invention.

Referring to FIGS. 5A and 5B, "RX" denotes a voltage applied to a gate of a reset transistor of the pixel unit, "TX" denotes a voltage applied to a gate of a transfer transistor of the pixel unit, "1H" denotes a horizontal data readout period and "SAMPLE" denotes a voltage applied to a gate of a sampling switch of the bias sampling unit 433 of the bias sampling device 430 described with reference to FIG. 4. During a correlated double sampling (CDS) operation period, a bias sampling operation is performed to prevent noise caused by the power of the pixel amplifying unit 440. Thus, a voltage applied to a gate of a sampling switch of the bias sampling unit 433 needs to be dropped and then raised during a time period from the completion of a pixel data readout, including a CDS in a previous 1H period, to the rising timing of the "RX".

As described above, the bias sampling device in accordance with an exemplary embodiment of the present invention performs sampling on a first bias voltage of a first current mirror circuit, which is a previous-staged current mirror circuit to a final-staged current mirror circuit, rather than sampling on a second bias voltage provided to a load transistor of the pixel amplifying unit, which is a transistor included in the final-staged current mirror circuit. Thus, pixels and current mirror circuits having various structures may be implemented.

Figure 6:
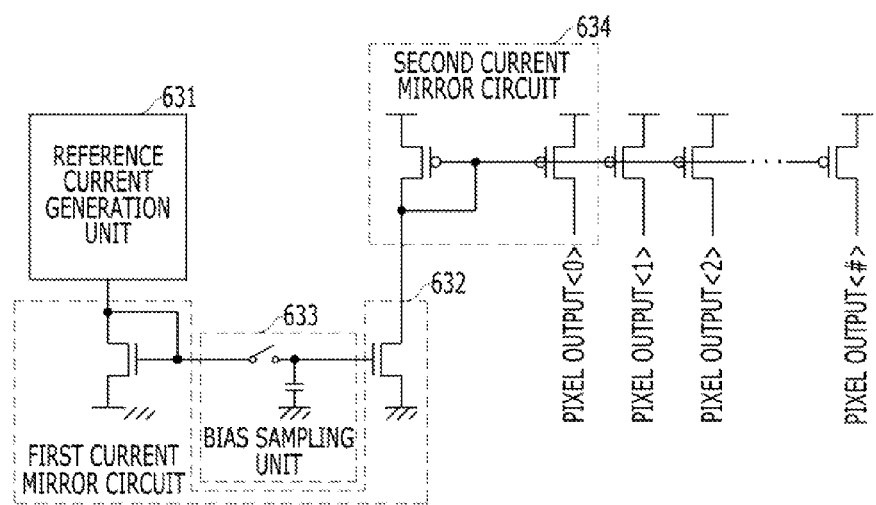
FIG. 6 is a block diagram illustrating a bias sampling device in accordance with another exemplary embodiment of the present invention.

FIG. 6 is a block diagram illustrating a bias sampling device in accordance with another exemplary embodiment of the present invention.

Referring to FIG. 6, the bias voltage generation unit may have a reference current generation unit 631, a first current mirror circuit 632, a second current mirror circuit 634, and a bias sampling unit 633. The bias sampling device shown in FIG. 6 may be implemented with the multi stage current mirror circuit described with reference to FIG. 3B. The reference current generation unit 631, the first current mirror circuit 632, the bias sampling unit 633 and the second current mirror circuit 634, shown in FIG. 6, are same as the reference current generation unit 431, the first current mirror circuit 432, the bias sampling unit 433 and the second current mirror circuit 434, described with reference to FIG. 4. A pixel amplifying unit (not shown) may be implemented using a source follower amplification circuit or other amplification circuits.

However, when a pixel has a PMOS type structure, as shown in FIG. 6, instead of the NMOS type structure described with reference to FIGS. 4 to 5B the second current mirror circuit 634 of the PMOS type may be disposed at the final stage, the first current mirror circuit 632 may be implemented to be a NMOS type, and the bias sampling unit 633 may be disposed between transistors of the first current mirror circuit 632. Herein, sampling timing of a bias voltage of a CMOS image sensor including the bias sampling device shown in FIG. 6 may be an inversion of the timing described with reference to FIG. 5B.

As shown in FIGS. 4 and 6, a bias sampling device including two-stage current mirror circuits receiving a reference current generated from the reference current generation unit and providing the bias voltage to the pixel amplifying unit is exemplarily explained. However, according to another embodiment, a bias sampling device having a multi-stage current mirror circuit including three or more current mirror circuits may perform the bias sampling at the earliest stage, thereby obtaining the same effect as the bias sampling device described with reference to FIGS. 4 to 6 without image deterioration caused by a global bias sampling structure. However, as the number of stages in the multi-stage current mirror circuit is increased, the number of transistors between the sampling switch and the final-staged current mirror circuit may be increased and thus thermal noise may increase. Therefore, it is not preferable for the multi-stage current mirror circuit to have an excessive number of stages of current mirror circuits.

Figure 7:
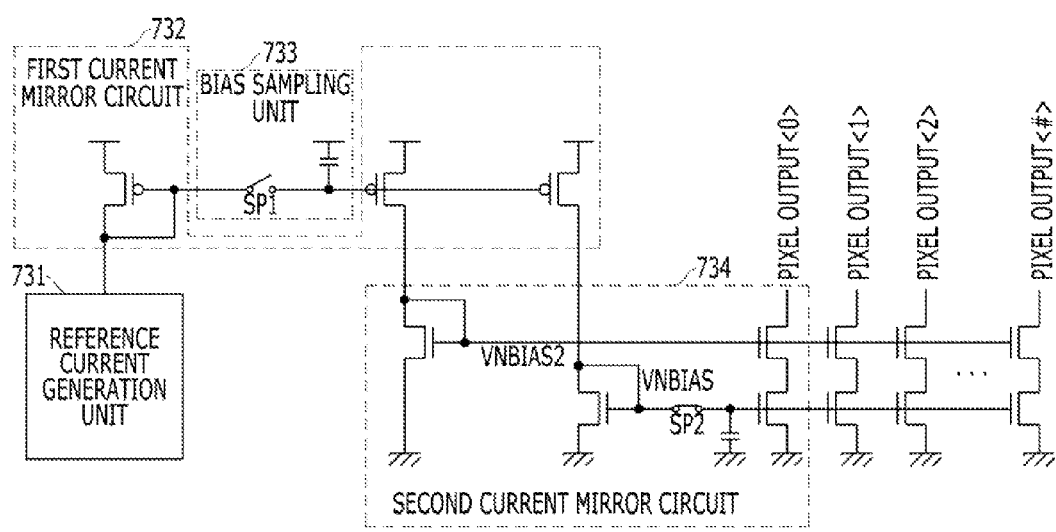
FIG. 7 is a block diagram illustrating a bias sampling device in accordance with still another exemplary embodiment of the present invention.

FIG. 7 is a block diagram illustrating a bias sampling device in accordance with still another exemplary embodiment of the present invention.

As shown in FIG. 7, the bias sampling device in accordance with still another exemplary embodiment of the present invention includes a reference current generation unit 731, a first current mirror circuit 732, a bias sampling unit 733 and a second current mirror circuit 734.

As shown in FIG. 7, the reference current generation unit 731 and the bias sampling unit 733 shown in FIG. 7 are same as the reference current generation unit 431, and the bias sampling unit 433 described with reference to FIG. 4. A pixel amplifying unit (not shown) may be implemented using a source follower amplification circuit or other amplification circuits.

The second current mirror circuit 734 may be implemented as in cascade form. When the second current mirror circuit 734 using the cascade form is implemented, since sampling operations of two gate biases may be performed using one sampling switch, it will be more efficiently implemented. That is, the second current mirror circuit 734 may include a second bias voltage line VNBIAS, a third bias voltage line VNBIAS2 and a second sampling switch SP2. The bias sampling is performed on the first bias voltage of the first current mirror 732 using a sampling switch SP1 of the bias sampling unit 733. Thus, the bias sampling is performed on a node of the second bias voltage line VNBIAS and a node of the third bias voltage line VNBIAS2. This may increase the noise improvement effects, which are obtained through the bias sampling.

The second sampling switch SP2 is disposed between transistors of the second current mirror circuit 734. A first sampling switch SP1 may be disposed between transistors of the first current mirror circuit 732.

Figure 8:
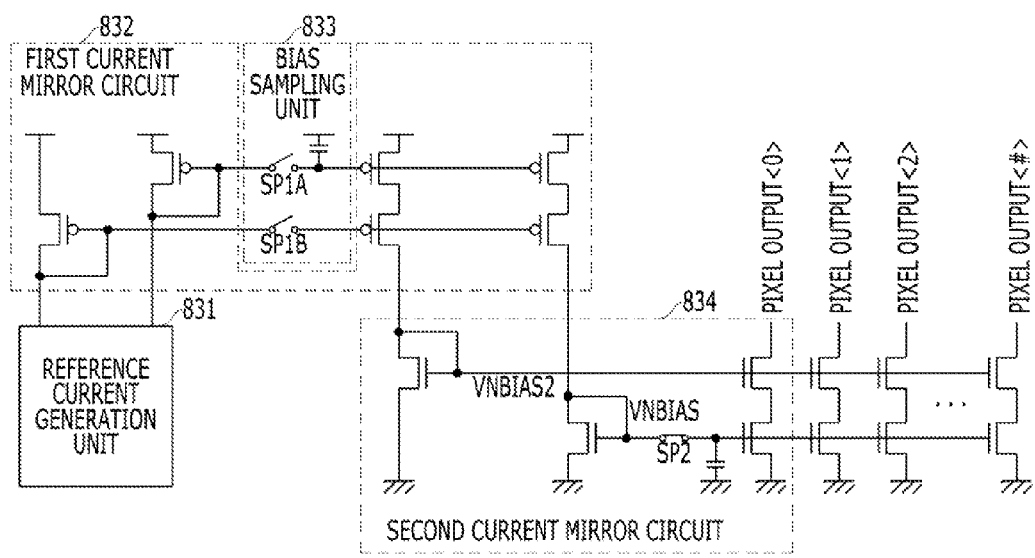
FIG. 8 is a block diagram illustrating a bias sampling device in accordance with still another exemplary embodiment of the present invention.

FIG. 8 is a block diagram illustrating a bias sampling device in accordance with still another exemplary embodiment of the present invention.

As shown in FIG. 8, a bias sampling device in accordance with still another exemplary embodiment of the present invention includes a reference current generation unit 831, a first current mirror circuit 832, a bias sampling unit 833 and a second current mirror circuit 834.

The reference current generation unit 831 and the second current mirror circuit 834, shown in FIG. 8, are same as the reference current generation unit 731 and the second current mirror circuit 734 shown in FIG. 7. A pixel amplifying unit (not shown) may be implemented using a source follower amplification circuit or other amplification circuits.

The first current mirror circuit 832 may be implemented in a cascade form. The bias sampling unit 833 may be implemented using two sampling switches SP1A and SP1B. Ire another embodiment of the present invention, one of the two sampling switches SP1A and SP1B may be omitted.

As described above, a bias sampling device in accordance with exemplary embodiments of the present invention may have a load transistor layout in the pixel amplifying unit occupying a small area compared with the local bias sampling structure, which needs a sampling capacitor having a large capacitance on a pitched layout region.

Figure 2A:
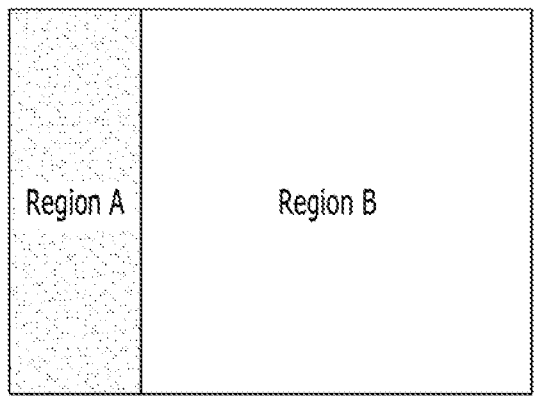
FIGS. 2A to 2C are diagrams illustrating image deterioration caused by a global bias sampling.
Figure 2B:
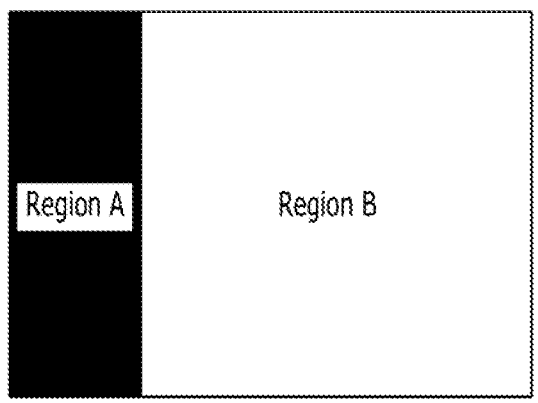
Figure 2C:
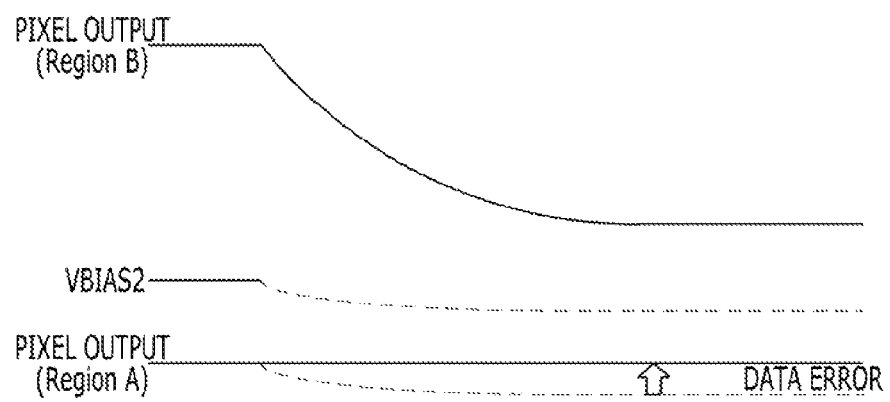

As shown in FIG. 2, in case of the global bias sampling structure, when pixel output lines of column are sharply changed with a large amplitude, data distortion of a neighboring column may be caused by a coupling on a second bias voltage line VNBIAS. But, according to an embodiment of the present invention, data distortion does not occur since sampling of the second bias voltage line VNBIAS is not performed.

Noise generated from the reference current generation unit, noise induced from power used in the pixel amplifying unit, or noise induced from external devices may be blocked by performing sampling on the first bias voltage line VPBIAS.

While the present invention has been described with respect to the specific embodiments, it will be apparent to those skilled in the art that various changes and modifications may be made without departing from the spirit and scope of the invention as defined in the following claims.

What is claimed is:

1. A bias sampling device, comprising:
a reference current generation unit suitable for generating a reference current;
a plurality of multi-staged current mirror circuits suitable for receiving the reference current generated from the reference current generation unit and outputting a bias voltage; and
a bias sampling unit suitable for performing sampling on a first bias voltage of a first current mirror circuit of the plurality of multi-staged current mirror circuits,
wherein the first bias voltage of the first current mirror circuit, which is located prior to a final-staged current mirror circuit of the plurality of multi-staged current mirror circuits, is preset.

2. The bias sampling device of claim 1, wherein the final-staged current mirror circuit is of a cascade type.

3. The bias sampling device of claim 2,
wherein each of the first and final-staged current mirror circuits comprises two or more transistors, and
wherein the bias sampling device further comprises:
a first sampling switch disposed between the transistors of the first current mirror circuit; and
a second sampling switch disposed between the transistors of the final-staged current mirror circuit.

4. The bias sampling device of claim 3, wherein the bias sampling unit switches a voltage applied to a gate of the first sampling switch before a rising timing of the voltage applied to the gate of a reset transistor after a read-out of pixel data is completed.

5. The bias sampling device of claim 1, wherein each of the first current mirror circuit and the final-staged current mirror circuit is of a cascade type.

6. A complementary metal-oxide semiconductor (CMOS) image sensor, comprising:
a row decoder and pixel driver suitable for selecting and driving a pixel of a pixel array;
a pixel amplifying unit suitable for amplifying a pixel signal of the pixel array;
a bias sampling device suitable for performing sampling on a first bias voltage of a first current mirror circuit of a plurality of multi-staged current mirror circuits, and applying the sampled first bias voltage to the pixel amplifying unit; and
a read-out processing unit suitable for reading-out the pixel signal amplified by the pixel amplifying unit,
wherein the first bias voltage of the first current mirror circuit, which is located prior to a final-staged current mirror circuit of the plurality of multi-staged current mirror circuits, is preset.

7. The CMOS image sensor of claim 6, wherein the bias sampling device includes:
a reference current generation unit suitable for generating a reference current;

the plurality of multi-staged current mirror circuits suitable for receiving the reference current generated from the reference current generation unit and outputting a bias voltage; and a bias sampling unit suitable for performing sampling on the first bias voltage of the first current mirror circuit: of the plurality of multi-staged current mirror circuits.

8. The CMOS image sensor of claim 6, wherein the final-staged current mirror circuit is of a cascade type.

9. The CMOS image sensor of claim 8, wherein each of the first and final-staged current mirror circuits comprises two or more transistors, and wherein the bias sampling device further comprises:

a first sampling switch disposed between the transistors of the first current mirror circuit; and a second sampling switch disposed between the transistors of the final-staged current mirror circuit.

10. The CMOS image sensor of claim 9, wherein the bias sampling unit switches a voltage applied to a gate of the first sampling switch before a rising timing of the voltage applied to the gate of a reset transistor after a read-out of pixel data is completed.

11. The CMOS image sensor of claim 6, wherein each of the first current mirror circuit and the final-staged current mirror circuit is of a cascade type.

12. The CMOS image sensor of claim 6, further comprising a capacitor suitable for preventing image deterioration caused by a coupling capacitor between a second bias voltage node and a pixel output line.

* * * * *